US012683330B2

(12) United States Patent
Singh

(10) Patent No.: US 12,683,330 B2
(45) Date of Patent: Jul. 14, 2026

(54) BRACKET FOR SUPPORTING A MODULE HAVING AN ELECTRICAL PLUG

(71) Applicant: Atlantic Health System, Inc., Morristown, NJ (US)

(72) Inventor: Vijendra Singh, Manalapan, NJ (US)

(73) Assignee: Atlantic Health System, Inc., Morristown, NJ (US)

( * ) Notice: Subject to any disclaimer, the term of this patent is extended or adjusted under 35 U.S.C. 154(b) by 0 days.

(21) Appl. No.: 18/768,283

(22) Filed: Jul. 10, 2024

(65) Prior Publication Data

US 2025/0132522 A1     Apr. 24, 2025

Related U.S. Application Data

(60) Provisional application No. 63/545,000, filed on Oct. 20, 2023.

(51) Int. Cl.
H01R 13/639 (2006.01)
F16M 13/02 (2006.01)

(52) U.S. Cl.
CPC ......... H01R 13/6395 (2013.01); F16M 13/02 (2013.01)

(58) Field of Classification Search
CPC .. H01R 13/73; H01R 31/065; H01R 13/6395; H04B 1/3883; H04B 1/3877

USPC ...................................... 248/233.41; 439/373
See application file for complete search history.

(56) References Cited

U.S. PATENT DOCUMENTS

| | | | | |
|---|---|---|---|---|
| 3,811,104 | A * | 5/1974 | Caldwell ............ | H01R 13/6395 |
| | | | | 439/373 |
| 8,070,111 | B1 * | 12/2011 | Zeller ...................... | H02G 3/32 |
| | | | | 248/65 |
| 9,147,973 | B1 * | 9/2015 | Madison ............ | H01R 13/6395 |
| D918,145 | S | 5/2021 | Varjabedian | |
| 11,557,864 | B2 * | 1/2023 | Varjabedian ........... | H01R 13/73 |
| 11,641,218 | B2 * | 5/2023 | Fan ...................... | H04B 1/3883 |
| | | | | 248/122.1 |

* cited by examiner

*Primary Examiner* — Todd M Epps
(74) *Attorney, Agent, or Firm* — The McHattie Law Firm; William Smith

(57) ABSTRACT

A bracket for supporting a device having an electrical plug integrated with or attached to the body of the device comprises a back plate, a band extending from one side of the back plate to an opposing side, a tab that extends downward, and an opening in the tab for receiving a screw or other fastener. The back plate further comprises an indentation that opens upward to receive the plug. With the body of the device between the back plate and the band, and the plug received within the indentation, a screw inserted through the opening attaches the bracket to an electrical outlet wall plate with the plug inserted into the electrical outlet, thereby restraining the body, and preventing the device from being inadvertently dislodged.

20 Claims, 7 Drawing Sheets

BRACKET FOR SUPPORTING A MODULE HAVING AN ELECTRICAL PLUG

CROSS-REFERENCE TO RELATED APPLICATIONS

The present application claims the benefit of U.S. Provisional Patent Application No. 63/545,000, which was filed on Oct. 20, 2023. The disclosures made in the aforesaid provisional patent application are incorporated herein by reference.

STATEMENT REGARDING FEDERALLY-FUNDED RESEARCH AND DEVELOPMENT

No federal funding was used in the research or development of the invention disclosed herein.

TECHNICAL FIELD OF INVENTION

The present invention is related to the field of brackets for wall-mounted devices, and, more particularly, to brackets for securing a wall-mounted device having an electrical plug so that the device does not inadvertently become unplugged.

BACKGROUND OF INVENTION

Many of the modern devices used to monitor workflow or conditions in the indoor environment are designed with electrical plugs integrated with the body of the device. Such designs allow the device to be plugged directly into electrical outlets to operate continuously and to keep them out of the flow of traffic. In a hospital environment, such devices may be essential for inventory management to prevent loss, for security, and for use in hygiene tracking to prevent the spread of infections. It is important that devices used for such purposes operate without power interruptions.

In most cases, the main source of mechanical support for the device is located where the plug is inserted into the electrical outlet. In such circumstances, the plug may become disconnected from the outlet by being jostled or be pulled out of the outlet by the weight of the device. An adhesive strip may be provided to attach the device to a wall or other surface, but the adhesive can dry out or become dirty at the edges, so that the attachment weakens and eventually fails.

SUMMARY OF THE INVENTION

In an embodiment, the present invention comprises a bracket for supporting a device having an electrical plug integrated with or attached to the body of the device. In an embodiment of the invention, the bracket comprises a back plate, a band extending from one side of the back plate to an opposing side, the back plate and band defining an interior space, the back plate further defining an indentation that opens upward, and an opening in the back plate for receiving a screw or other fastener. In an embodiment of the invention, the backplate has a tab that extends downward, and the opening is through the tab. In an embodiment of the invention, one or both of the back plate and the band have ridges that protrude into the interior space. In an embodiment of the invention, the features of the bracket are arranged such that, with the body of the device residing in the interior space of the bracket, the plug is received within the indentation, and the back plate and band encompass the body in a belt-like arrangement, thereby restraining the body in the bracket. Further, with the body so restrained, a screw inserted through the opening attaches the bracket to an electrical outlet wall plate with the plug inserted into the associated electrical outlet.

BRIEF DESCRIPTION OF DRAWINGS

For a better understanding of the present invention, reference is made to the following detailed description considered in conjunction with the accompanying drawings, in which.

DETAILED DESCRIPTION

Figures 1, 2, 3:
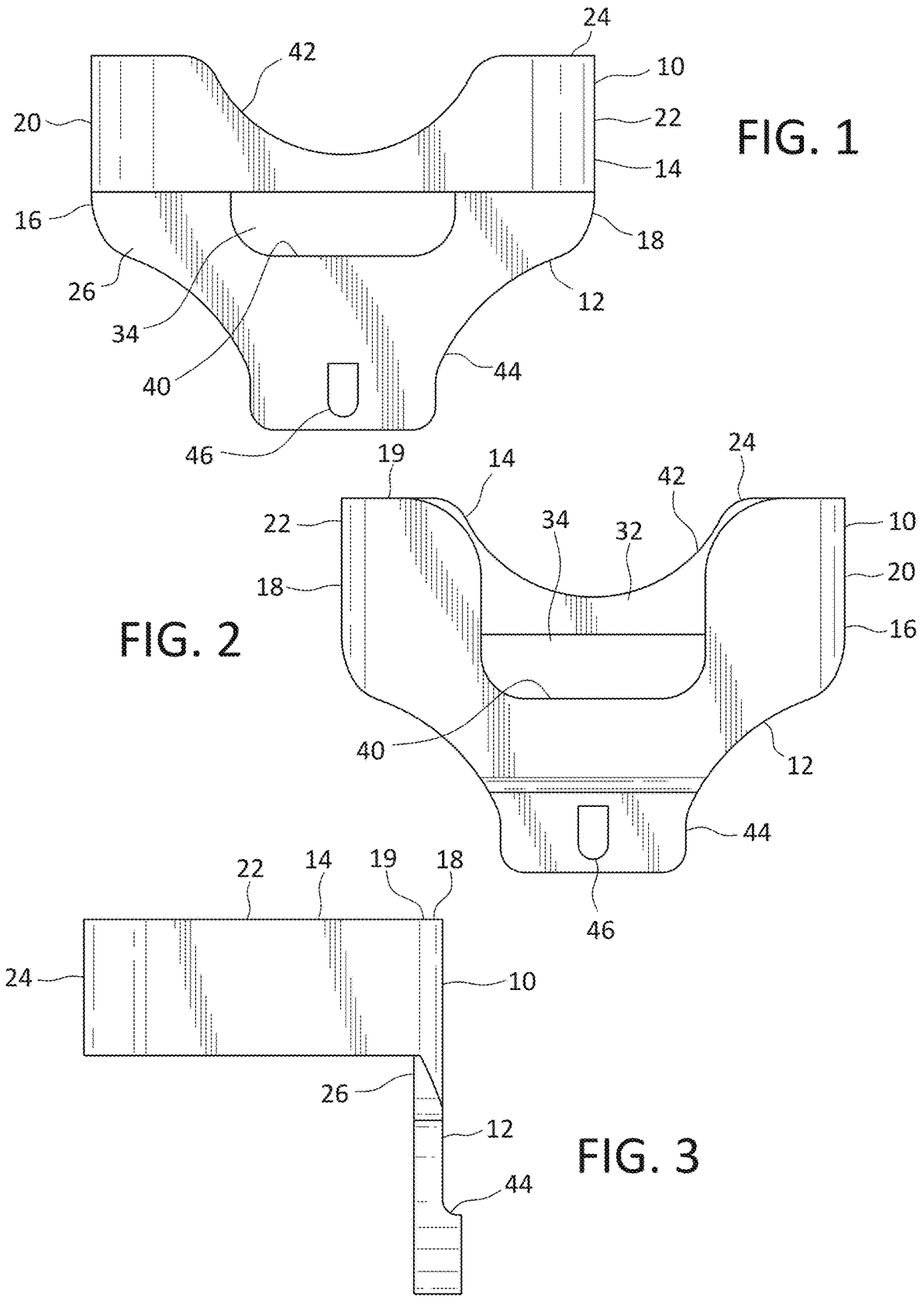
FIG. 1 is a front view of a bracket for securing a device having an electrical plug according to an embodiment of the present invention.
FIG. 2 is a back view of the bracket of FIG. 1.
FIG. 3 is a right-side view of the bracket of FIG. 1.

Reference will now be made in detail to one or more embodiments of the invention, examples of which are schematically illustrated in the accompanying drawings. The embodiments are intended to provide an explanation of the invention, and are not meant as a limitation of the invention. For example, features illustrated or described as part of one embodiment may be utilized or combined with features of another embodiment to yield a new embodiment. Further, the features of the embodiment are not limited as to dimensions, number, materials, or other variable features consistent with the use and operation of the invention.

As used herein, the conjunction "or" includes all of the conjoined elements, some subset of the conjoined elements, or one element alone. For example, "A or B" may include either both A and B, A alone, or B alone. "And/or", if used, has the same meaning as "or". "Either . . . or . . . " and "neither . . . nor . . . ", if used, have their common meanings.

As used herein, "attach" or "attached" refer to the bonding, fusing, joining, adhering, connecting, or the like, of a first element to a second element. Two elements may be considered to be attached when they are bonded, fused, joined, adhered, connected, molded, co-molded, or the like, directly to each other, with no intervening element, or indirectly to each other, such as when each of a first element and a second element is attached to an intervening element between them.

As used herein, "retain", "retained", "restrain", or "restrained" refer to the arrangement of two elements such that one element limits the range of motion of the other element and/or prevents separation of the two elements during normal use of the invention.

The terms "front", "back", "top", "bottom", "left", "right", and other terms indicating direction or orientation are intended to be interpreted according to the orientation of the bracket shown in FIGS. 1-13 and described in the Brief Description of Drawings.

In figures showing a plurality of identical elements, or structurally similar elements performing the same function, the same reference number may be used for all such elements. Where otherwise identical elements are differentiated in the description of the invention, the reference numbers may be distinguished by the addition of a lowercase letter to distinguish the elements, or by different reference numbers. Where the same element is shown in more than one figure, the same reference number may be used on each figure on which the element is shown.

For the purpose of the detailed description provided herein, the exemplary device having an electrical plug is based on the SwipeSense® Location Hub, model HUB520, designed by SwipeSense, Chicago, Illinois. The SwipeSense® Location Hub is a third-party device and is addressed solely to aid understanding of the features of the bracket. It will be understood by one having ordinary skill in the art and possession of the present disclosure, that the exemplary bracket of the present invention may be adapted for use with other devices having an electrical plug integrated with or attached to the body of the device by varying the size or shape of the elements of the exemplary bracket discussed or shown in the specification, to restrain movement of such devices so that inadvertent electrical disconnections from the electrical supply can be avoided.

Turning to FIG. 1, taken in combination with FIGS. 2-6, the bracket 10 comprises a back plate 12 and a band 14 extending from a left end 16 of the back plate 12 to a right end 18 of the back plate 12. The band 14 has a left portion 20, a right portion 22, and a front portion 24. The left portion 20 extends from the left end 16 of the back plate 12 to the front portion 24, and the right portion 22 extends from the right end 18 of the back plate 12 to the front portion 24. The back plate 12, the left portion 20, the right portion 22, and the front portion 24 have respective interior surfaces 26, 28, 30, 32, which define an interior space 34 of the bracket 10. As shown in FIGS. 1-6, the interior surfaces 26, 28, 30, 32 may be substantially flat. In other embodiments, one or more of the interior surfaces 26, 28, 30, 32, may have other shapes. For example, one or more of the interior surfaces 26, 28, 30, 32 may be shaped to provide support to an outer surface of a device (not shown in FIGS. 1-6) residing in the interior space 34.

Figures 4, 5, 6:
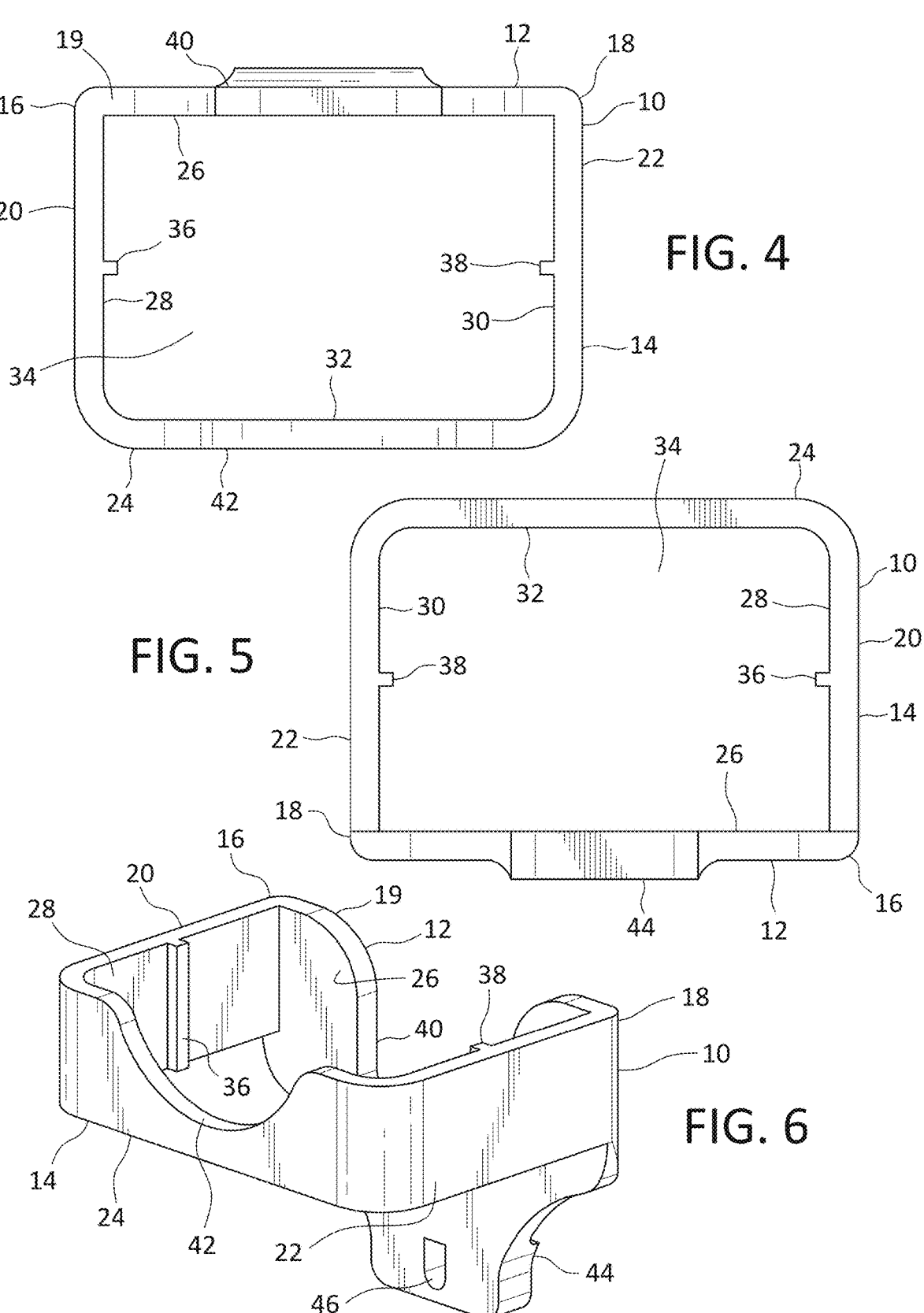
FIG. 4 is a top-down view of the bracket of FIG. 1.
FIG. 5 is a bottom-up view of the bracket of FIG. 1.
FIG. 6 is a front oblique view of the bracket of FIG. 1.
Figures 7, 8:
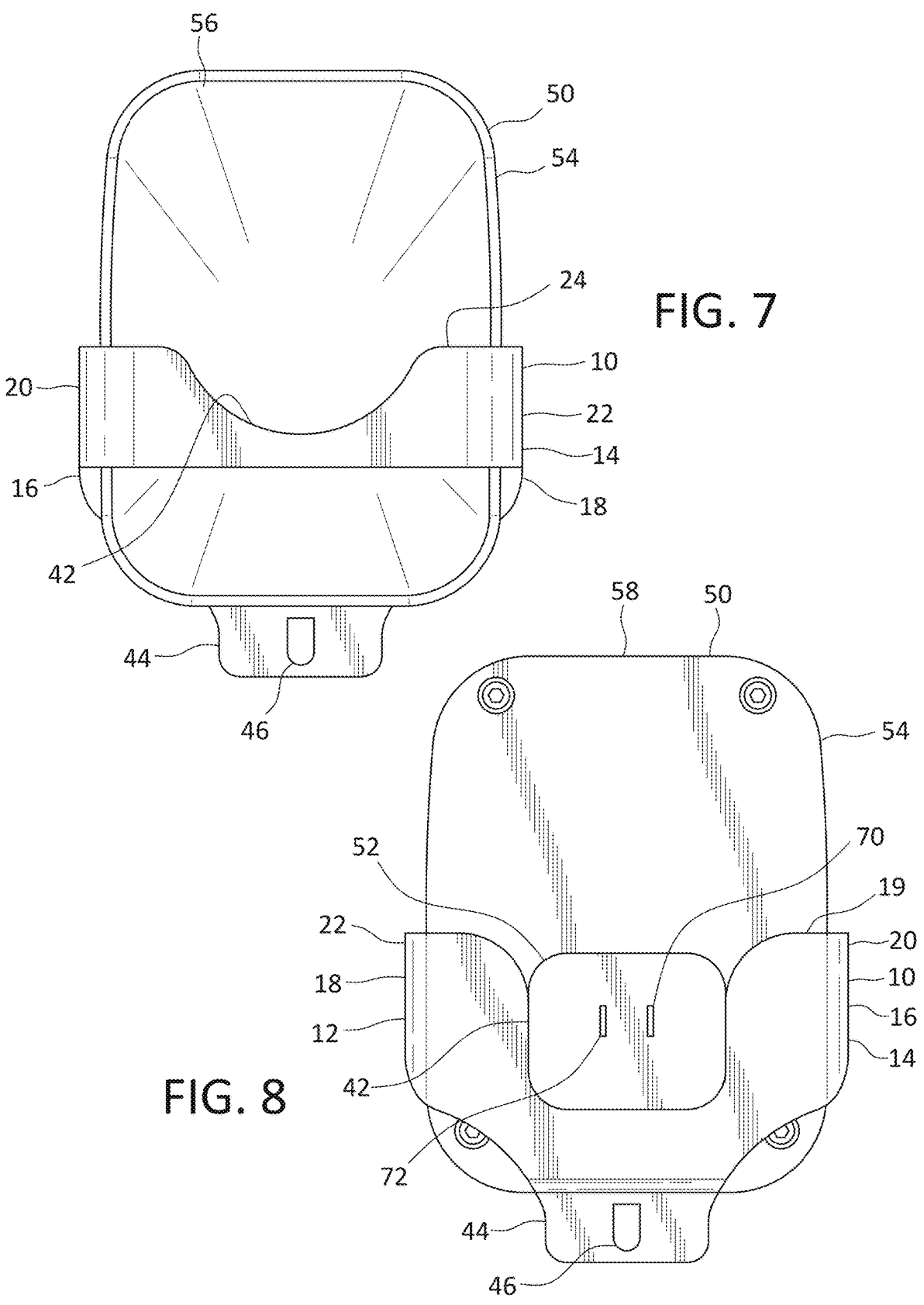
FIG. 7 is a front view of the bracket of FIG. 1 in combination with an exemplary device, illustrating a practical use of the invention.
FIG. 8 is a back view of the combination of FIG. 7.
Figures 9, 10:
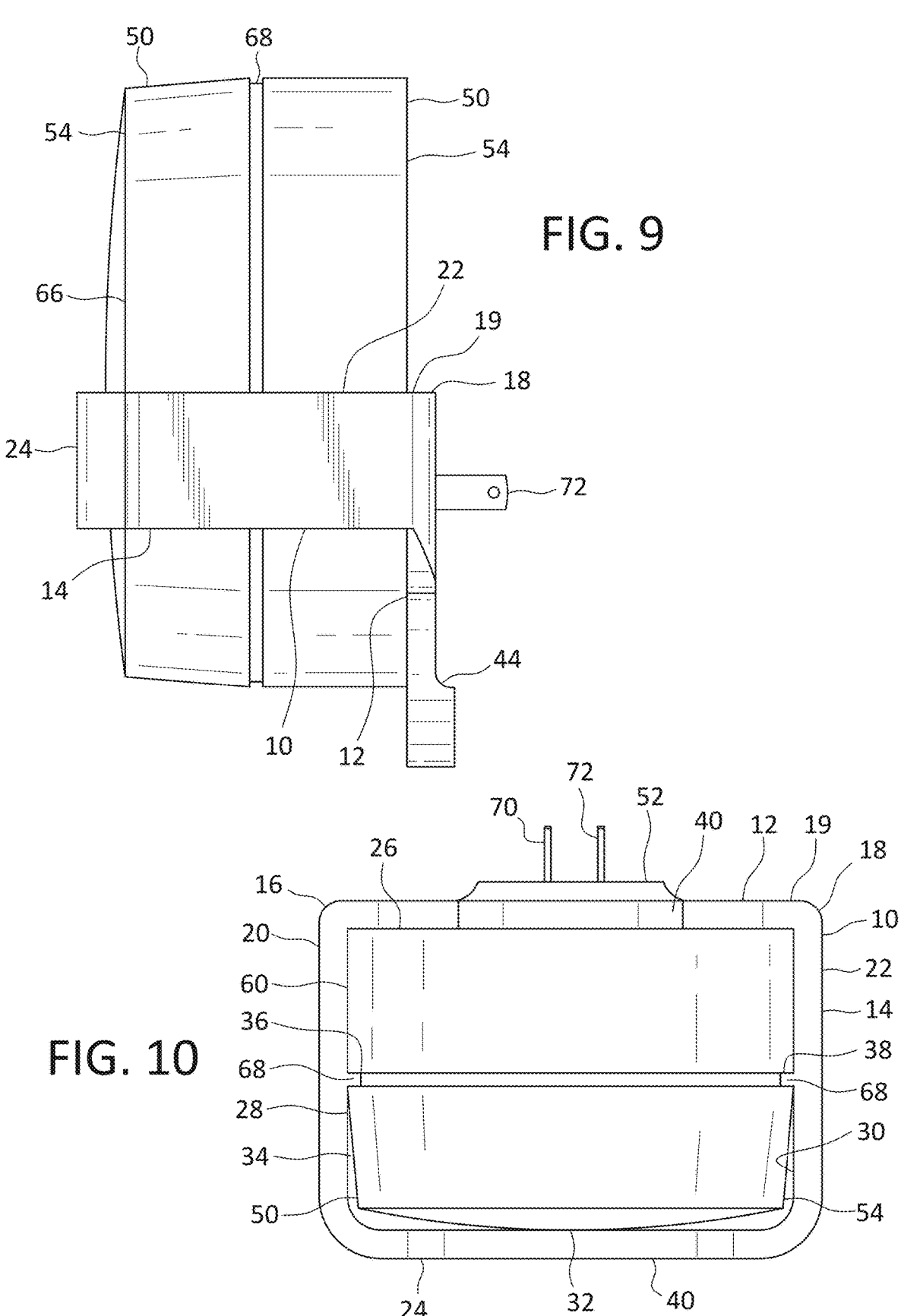
FIG. 9 is a right-side view of the combination of FIG. 7.
FIG. 10 is a top-down view of the combination of FIG. 7.
Figures 11, 12:
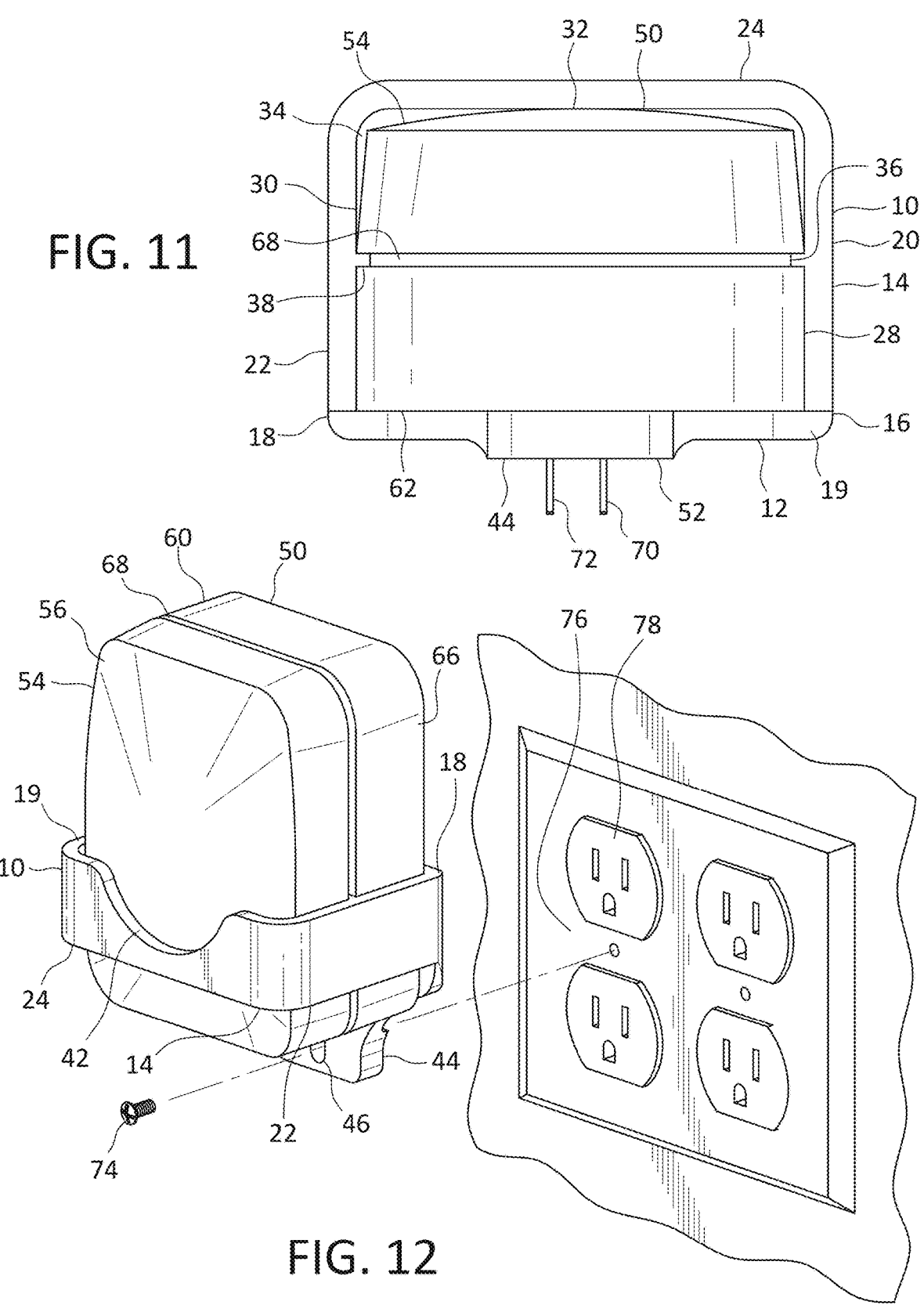
FIG. 11 is a bottom-up view of the combination of FIG. 7.
FIG. 12 is a front oblique exploded view of the combination of FIG. 7 in relation to electrical outlets and an electrical outlet wall plate which are not part of the invention.

As shown in FIGS. 4-6, the interior surfaces 28, 30 of the left portion 20 and the right portion 22 may be provided with ridges 36, 38 that protrude into the interior space 34. Such ridges 36, 38 may arranged so as to interact with features of a device (not shown) residing in the interior space 34 of the bracket 10, to aid in positioning such a device, to provide a pressure fit against such a device, to support such a device, or to serve another purpose with respect to use or management of the device. In other embodiments, ridges (not shown) may be provided on the interior surfaces 26, 32 of the back plate 12 and front portion 20 of the band 14, or multiple ridges may be provided on one or more of the interior surfaces 26, 28, 30, 32, or the interior surfaces 26, 28, 30, 32 may be provided without ridges. In other embodiments, other protrusions may be provided that are not ridges, but that protrude into the interior space 34. As an example, such protrusions (not shown) may have a U-shape opening upwards or an angular shape opening upwards (i.e., toward the uppermost end 19 of the back plate 12) that could support a member protruding from a device placed into the interior space 34.

Referring to FIGS. 1, 2, and 6, the back plate 12 of the bracket 10 is provided with an indentation 40 opening upwards. The indentation 40 is positioned and shaped to position or support, or to aid in positioning or supporting, a member of a device (not shown) residing in the interior space 34 of the bracket 10. The member (not shown) may be attached directly or indirectly to the device. For the exemplary device described further below with respect to FIGS. 7-15, the member may be an electrical plug. The bracket 10 also includes a second indentation 42 in the front portion 24 of the band 14. This second indentation 42 relates to a feature of the exemplary device 50 discussed with respect to FIGS. 7-15, and may be absent in other embodiments of the present invention.

Continuing to refer to FIGS. 1-6, the back plate 12 of the bracket 10 is provided with a tab 44 extending downward, in a direction away from the uppermost end 19 of the back plate 12. The tab 44 is provided with an opening 46 to receive a screw or other fastener (not shown). In an embodiment of the bracket 10, the tab 44 may be substantially coplanar with the rest of the back plate 12. In an embodiment of the bracket 10, the tab 44 and the back plate 12 may be arranged in a non-coplanar arrangement. In an embodiment, the tab 44 is between the left end 16 of the back plate 12 and the right end 18 of the back plate 12, the tab 44 extending downward.

Turning to FIGS. 7-15, the bracket 10 of the present invention is arranged to receive and restrain a device 50 having an electrical plug 52. The device 50 includes a body 54 having a front outer surface 56, a back outer surface 58, a top outer surface 60, a bottom outer surface 62, a left outer surface 64, and a right outer surface 66, a groove 68 extending along the top outer surface 60, left outer surface 64, bottom outer surface 62, and right outer surface 66. The electrical plug 52 is attached to the body 54 of the device 50 at the back surface 58 of the device 50, and has two electrically-conductive prongs 70, 72 extending outward, away from the back surface 58. The device 50 is further provided with a transmitting antenna (not shown) within the body 54. The second indentation 42, mentioned above with respect to FIGS. 1-6, is provided so that the front portion 24 of the band 14 does not obstruct the transmitting antenna.

Figure 13:
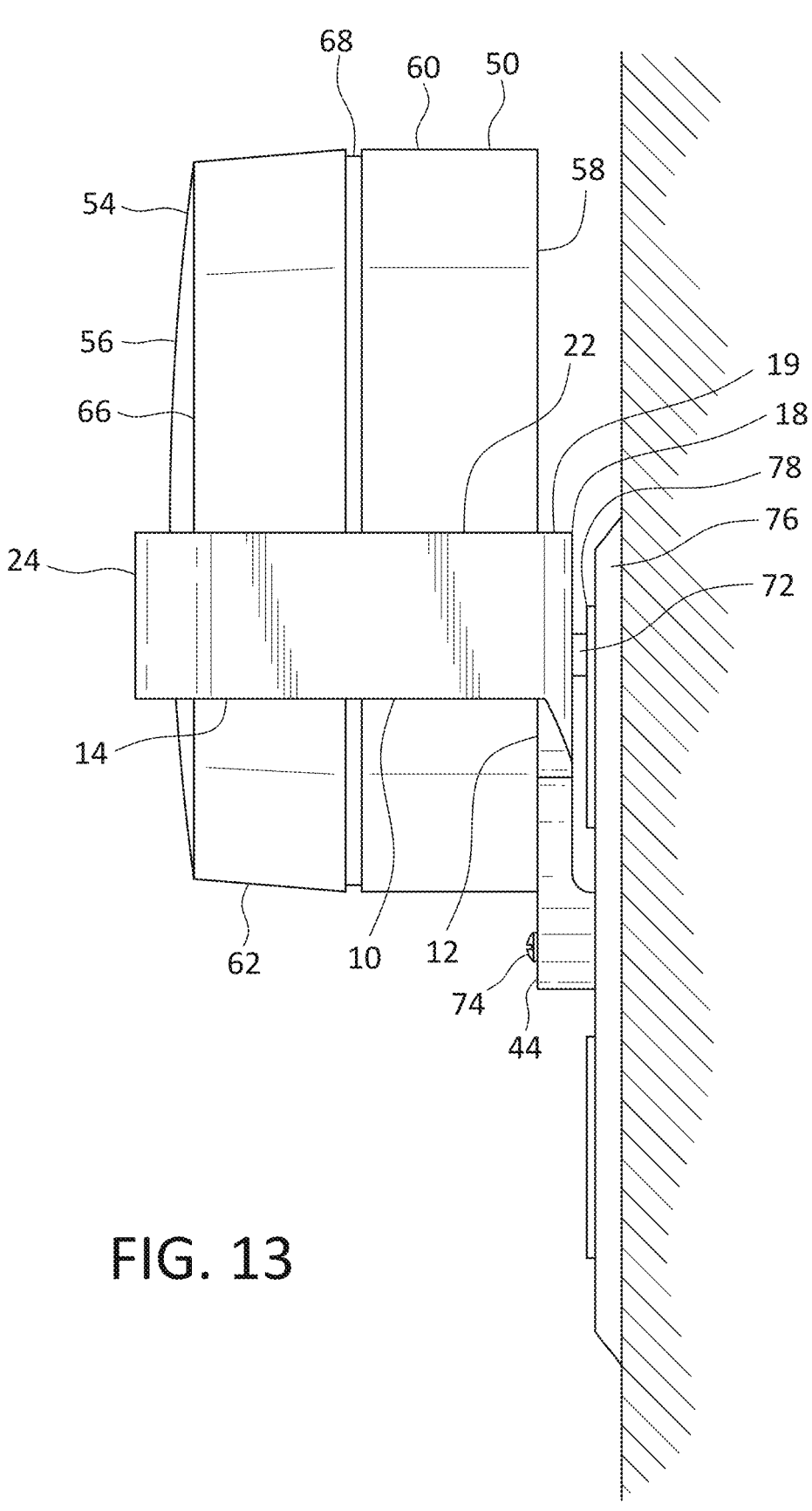
FIG. 13 is a right-side view of the combination of FIG. 7 installed at the electrical outlets and wall plate.
Figures 14, 15:
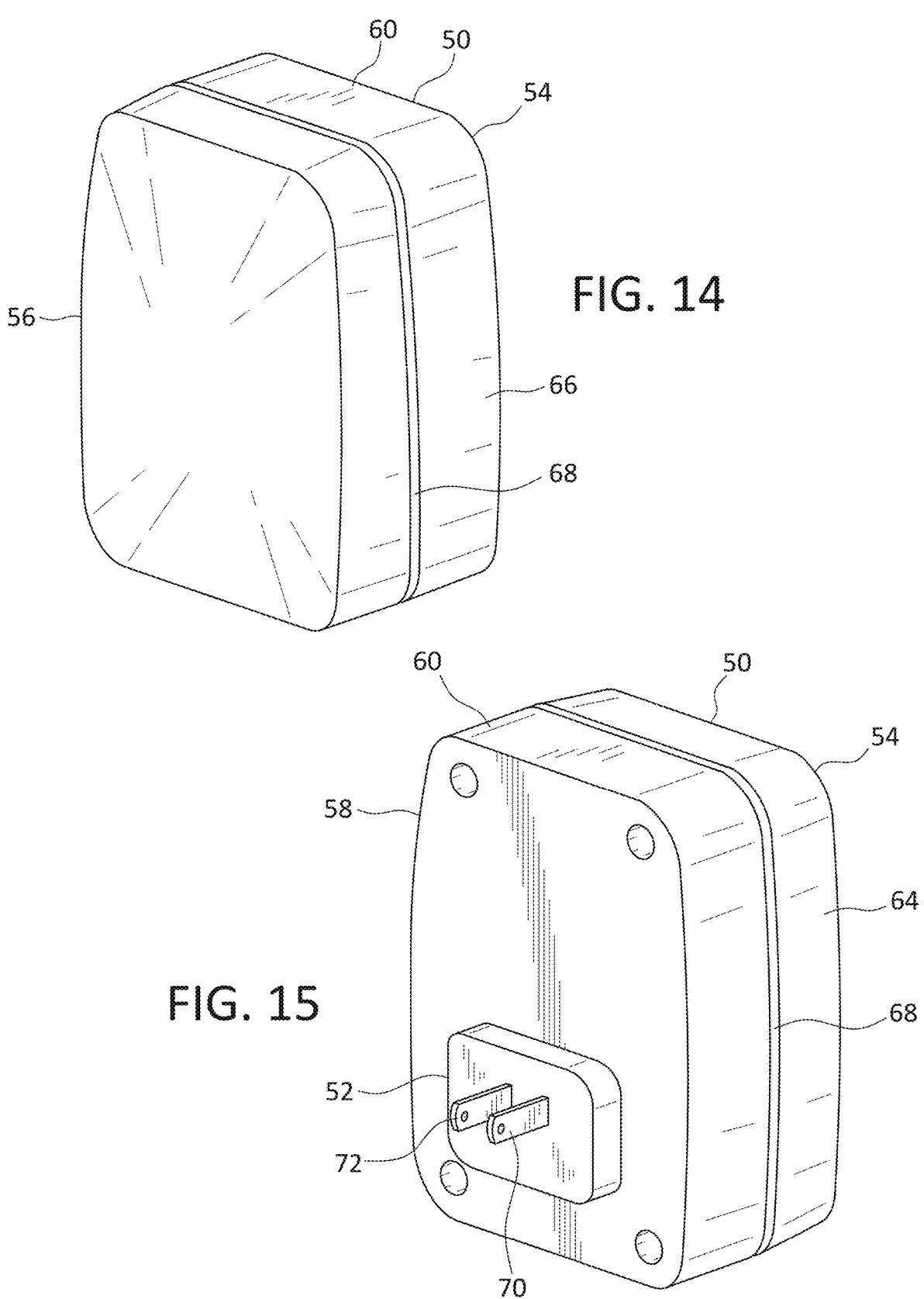
FIG. 14 is a front oblique view of the exemplary device of FIG. 7.
FIG. 15 is a back oblique view of the exemplary device of FIG. 7.

Continuing to refer to FIGS. 7-11, the body 54 of the device 50 resides within the interior space 34 of the bracket 10 with the back plate 12 and band 14 encompassing the body 54 in a belt-like fashion. In the exemplary embodiment, the ridges 36, 38 of the bracket 10 interact with the groove 68 to aid in positioning and restraining the body 54 within the bracket 10. The plug 52 resides within the indentation 40, and the prongs 70, 72 extend beyond the back plate 12 of the bracket 10. Referring to FIGS. 12 and 13, the opening 46 in the tab 44 and the indentation 40 are positioned so that a screw 74 may be inserted through the opening 45 and screwed into standard electrical outlet hardware 76 when the prongs 70, 72 are inserted into an associated electrical outlet 78.

In an embodiment, the interior surfaces 28, 30 of the left and right portions 20, 22 of the band 14 press against the left and right outer surfaces 64, 66 of the body 54. In some such embodiments, the ridges 36, 38 need not be provided.

In the present exemplary embodiment, the bracket 10 is a single piece of material. In other embodiments, the bracket 10 may comprise a plurality of pieces of one of more materials. In an embodiment, the bracket 10 is made of a substantially rigid material. In other embodiments, one or more portions of the bracket 10 may made of flexible or elastic materials.

In an embodiment of the present invention, the body 54 resides in the interior space of the bracket 10 with the plug 52 positioned in the indentation 40 in the back plate 12 of the bracket 10. The prongs 70, 72 of the plug 52 are inserted into the electrical outlet 78, and the screw 74 is inserted through the opening 46 and screwed into the electrical outlet hardware 76. In this configuration, the screw 74 supports the weight of the bracket 10 and device 50. Further, the bracket 10 provides support at the plug 52, relieving the weight of the device 52 on the prongs 70, 72 and the outlet 78. Further, securing the bracket 10 in this manner also restrains the device 50 so that the plug 52 does not inadvertently become disconnected from the outlet 78.

Embodiments of the bracket 10 may be made in a ground-upward layering process, such as fused deposition modeling (FDM), or by injection molding. In other embodiments, the bracket 10 may be made by machining sheets or tubes of material. The bracket 10 may be made from metals, plastics, or other suitable materials. Suitable plastics include, but are not limited to acrylonitrile butadiene styrene (ABS), high-impact polystyrene (HIPS) and general-purpose polystyrene (GPPS). Other suitable materials will be apparent to those having ordinary skill in the relevant arts.

The foregoing Detailed Description is to be understood as being in every respect illustrative and exemplary, but not restrictive, and the scope of the invention disclosed herein is not to be determined from the Detailed Description, but rather from the appended claims as interpreted according to the full breadth permitted by the patent laws. Accordingly, various modifications, including other dimensions and placements of the disclosed features, may be implemented by those skilled in the art without departing from the scope of the invention.

I claim:

1. A bracket for supporting a device having a body and an electrical plug integrated with or attached to the body, said bracket comprising:
   a back plate having a left end, a right end opposite said left end, and an uppermost end between said left end and said right end;
   a band extending from said left end of said back plate to said right end of said back plate, said back plate and said band defining an interior space of said bracket;
   an indentation in said back plate opening upward toward said uppermost end of said back plate; and
   an opening through said back plate.

2. The bracket of claim 1, wherein said back plate has a tab that is substantially coplanar with said back plate, said opening being through said tab.

3. The bracket of claim 1, wherein said back plate has a tab between said left end of said back plate and said right end of said back plate, said tab extending downward in a direction away from said uppermost end of said back plate, said opening being through said tab.

4. The bracket of claim 1, wherein said bracket has a second indentation in said band.

5. The bracket of claim 1, wherein one or both of said back plate and said band has protrusions that protrude toward said interior space of said bracket.

6. The bracket of claim 5, wherein one or more of said protrusions is a ridge.

7. The bracket of claim 5, with the device residing in the interior space, the device having one or more outer surfaces, wherein one or more of said protrusions interacts with the one or more outer surfaces to position the device, to press on the one or more outer surfaces, or to support the device.

8. The bracket of claim 5, wherein said protrusions have shapes that open upward toward the uppermost end of said bracket.

9. The bracket of claim 1, wherein said back plate, said band, said interior space, said indentation, and said opening are arranged to cooperate with the device and a standard electrical outlet and hardware associated with the outlet, the body of the device including at least a left outer surface, a right outer surface, a back outer surface, and a front outer surface, the electrical plug being attached to the back outer surface and having at least two electrically-conductive prongs extending in a direction away from the back outer surface of the device, the bracket cooperating with the device, the outlet, and the hardware associated with the outlet so that, with the body of the device in said interior space of said bracket, the plug is positioned in said indentation and the prongs inserted into the electrical outlet, and a screw within said opening in said tab attaches said bracket to the hardware associated with the electrical outlet.

10. The bracket of claim 9, wherein one or both of said band and said back plate positions or supports the body of the device in said interior space of said bracket.

11. The bracket of claim 9, wherein said indentation positions or supports the electrical plug.

12. The bracket of claim 9, wherein said screw positions or supports said bracket.

13. The bracket of claim 9, wherein said bracket has a tab that is substantially coplanar with said back plate, said opening being through said tab.

14. The bracket of claim 9, wherein said back plate has a tab between said left end of said back plate and said right end of said back plate, said tab extending downward in a direction away from said uppermost end of said back plate, said opening being through said tab.

15. The bracket of claim 9, wherein the device has a transmitter therein, and said band has a second indentation located so as to not obstruct transmissions from the transmitter when the body of the device is in said interior space.

16. The bracket of claim 9, wherein said band has protrusions protruding toward the interior space and interacting with at least the left outer surface and the right outer surface of the device.

17. The bracket of claim 16, wherein one or more of said protrusions is a ridge.

18. The bracket of claim 17, one or more of the left outer surface and the right outer surface of the device having a groove therein, wherein said ridge interacts with the groove to position the body of the device or press upon the groove.

19. A bracket for supporting a device having a body and an electrical plug integrated with or attached to the body, said bracket comprising:
   a back plate having a left end, a right end opposite said left end, and an uppermost end between said left end and said right end;
   a band extending from said left end of said back plate to said right end of said back plate, said back plate and said band defining an interior space of said bracket;
   an indentation in said back plate opening upward toward said uppermost end of said back plate; and an opening through said back plate, wherein one or both of said back plate and said band has protrusions that protrude toward said interior space of said bracket, wherein one or more of said protrusions is a ridge, and wherein, the device having one or more outer surfaces having a groove therein, and the device residing in said interior space, said ridge interacts with the groove to position the device or press upon the groove.

20. A bracket for supporting a device having a body and an electrical plug integrated with or attached to the body, said bracket comprising:

a back plate having a left end, a right end opposite said left end, and an uppermost end between said left end and said right end;

a band extending from said left end of said back plate to said right end of said back plate, said back plate and said band defining an interior space of said bracket;

an indentation in said back plate opening upward toward said uppermost end of said back plate;

ridges protruding from said band toward said interior space of said bracket;

a tab between said left end of said back plate and said right end of said back plate, said tab extending downward in a direction away from said uppermost end of said back plate; and an opening through said tab.

* * * * *